United States Patent
Hara et al.

(10) Patent No.: US 12,307,883 B2
(45) Date of Patent: May 20, 2025

(54) ELECTRIC TOOL SYSTEM, MANAGEMENT SYSTEM, MANAGEMENT METHOD, AND NON-TRANSITORY STORAGE MEDIUM

(71) Applicant: Panasonic Intellectual Property Management Co., Ltd., Osaka (JP)

(72) Inventors: Yuta Hara, Osaka (JP); Takayuki Sasaki, Osaka (JP); Tetsuya Ohashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 362 days.

(21) Appl. No.: 17/897,963

(22) Filed: Aug. 29, 2022

(65) Prior Publication Data

US 2023/0066755 A1 Mar. 2, 2023

(30) Foreign Application Priority Data

Sep. 2, 2021 (JP) ................. 2021-143483

(51) Int. Cl.
*H04W 76/00* (2018.01)
*B25F 5/00* (2006.01)
*G08C 17/02* (2006.01)
*H04W 76/10* (2018.01)
*B25B 23/147* (2006.01)

(52) U.S. Cl.
CPC ............... *G08C 17/02* (2013.01); *B25F 5/00* (2013.01); *H04W 76/10* (2018.02); *B25B 23/1475* (2013.01)

(58) Field of Classification Search
CPC .. G08C 17/02; B25F 5/00; B25F 5/02; H04W 76/10; B25B 23/1475
See application file for complete search history.

(56) References Cited

U.S. PATENT DOCUMENTS

| | | | |
|---|---|---|---|
| 8,763,720 B2 * | 7/2014 | Moore | B25F 5/00 173/4 |
| 2014/0284070 A1 * | 9/2014 | Ng | B25F 5/00 173/2 |

(Continued)

FOREIGN PATENT DOCUMENTS

| | | | |
|---|---|---|---|
| JP | 2000-334670 A | 12/2000 | |
| JP | 2018-108633 A | 7/2018 | |
| WO | WO-2016179271 A1 * | 11/2016 | B23Q 17/00 |

OTHER PUBLICATIONS

Extended European Search Report dated Mar. 22, 2023 issued in the corresponding European Patent Application No. 22193161.1.

(Continued)

*Primary Examiner* — Ping Y Hsieh
(74) *Attorney, Agent, or Firm* — Rimon P.C.

(57) ABSTRACT

An electric tool system includes an electric tool and a management system. The electric tool includes a first communications unit that establishes wireless communication. The electric tool is used to do work on a work target. The management system includes a second communications unit that communicates wirelessly with the first communications unit of the electric tool. The management system makes the second communications unit transmit, during a single communication session with the first communications unit, setting information about multiple tasks of the work to the first communications unit.

13 Claims, 8 Drawing Sheets

(56) References Cited

U.S. PATENT DOCUMENTS

2014/0367134 A1* 12/2014 Phillips ................ B25B 23/147
                                                      173/176
2019/0294138 A1   9/2019 Dobashi et al.
2021/0240145 A1*  8/2021 Abbott ..................... B25F 5/00

OTHER PUBLICATIONS

Notice of Reasons for Refusal dated Oct. 1, 2024 issued in the corresponding Japanese Patent Application No. 2021-143483, with English machine translation.

* cited by examiner

ELECTRIC TOOL SYSTEM, MANAGEMENT SYSTEM, MANAGEMENT METHOD, AND NON-TRANSITORY STORAGE MEDIUM

CROSS-REFERENCE TO RELATED APPLICATIONS

The present application is based upon, and claims the benefit of priority to, Japanese Patent Application No. 2021-143483, filed on Sep. 2, 2021, the entire contents of which are hereby incorporated by reference.

TECHNICAL FIELD

The present disclosure generally relates to an electric tool system, a management system, a management method, and a non-transitory storage medium. More particularly, the present disclosure relates to an electric tool system including an electric tool for use in work to be done on a work target, a management system, a management method, and a non-transitory storage medium.

BACKGROUND ART

JP 2000-334670 A discloses an electric tool control system (electric tool system) including an electric tool and a center manager (management system). The center manager transmits preset screw fastening information to the electric tool over a network. The electric tool controls the rotation of its motor in accordance with the screw fastening information received.

In the electric tool control system of JP 2000-334670 A, if the electric tool is a portable tool, then the communication between the electric tool and the center manager is preferably established wirelessly. Nevertheless, in a situation where wireless communication needs to be established between the electric tool and the center manager, the electric tool may fail to receive the screw fastening information from the center manager depending on the communication environment. The failure to receive the screw fastening information would prevent the electric tool from doing the work of fastening the screw, thus possibly causing a decline in work efficiency.

SUMMARY

The present disclosure provides an electric tool system, a management system, a management method, and a non-transitory storage medium, all of which are configured or designed to reduce the chances of causing a decline in the efficiency of work to be done using an electric tool.

An electric tool system according to an aspect of the present disclosure includes an electric tool and a management system. The electric tool includes a first communications unit that establishes wireless communication. The electric tool is to be used to do work on a work target. The management system includes a second communications unit that communicates wirelessly with the first communications unit of the electric tool. The management system makes the second communications unit transmit, during a single communication session with the first communications unit, setting information about multiple tasks of the work to the first communications unit.

A management system according to another aspect of the present disclosure includes a communications unit and a control unit. The communications unit of the management system communicates wirelessly with a communications unit included in an electric tool. The electric tool is to be used to do work on a work target. The control unit makes the communications unit of the management system transmit, during a single communication session with the communications unit of the electric tool, setting information about multiple tasks of the work.

A management method according to still another aspect of the present disclosure is a method for managing work to be done on a work target by an electric tool. The electric tool includes a communications unit that establishes wireless communication. The management method includes establishing the wireless communication with the communications unit. The wireless communication includes transmitting, during a single communication session with the communications unit, setting information about multiple tasks of the work to the communications unit.

A non-transitory storage medium according to yet another aspect of the present disclosure stores thereon a program. The program is designed to cause a computer system to perform the management method described above.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION

Embodiment

An electric tool system according to an exemplary embodiment of the present disclosure will be described in detail with reference to the accompanying drawings. Note that the embodiment and its variations to be described below are only exemplary ones of various embodiments of the present disclosure and their variations and should not be construed as limiting. Rather, the exemplary embodiment and variations may be readily modified in various manners depending on a design choice or any other factor without departing from a true spirit and scope of the present disclosure. Also, the embodiment and its variations may be adopted in combination as appropriate.

(1) Overview

First, an overview of an electric tool system 1 according to an exemplary embodiment and a management system 3 included in the electric tool system 1 will be described with reference to FIGS. 1 and 2.

Figure 1:
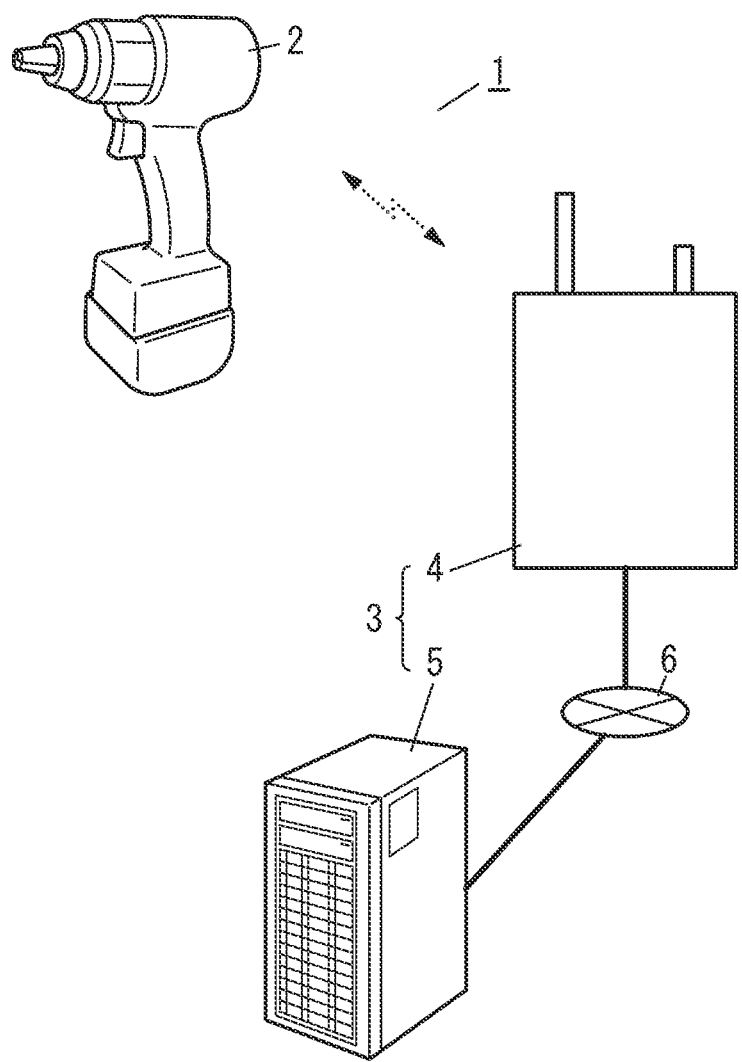
FIG. 1 illustrates a schematic system configuration for an electric tool system according to an exemplary embodiment.
Figure 2:
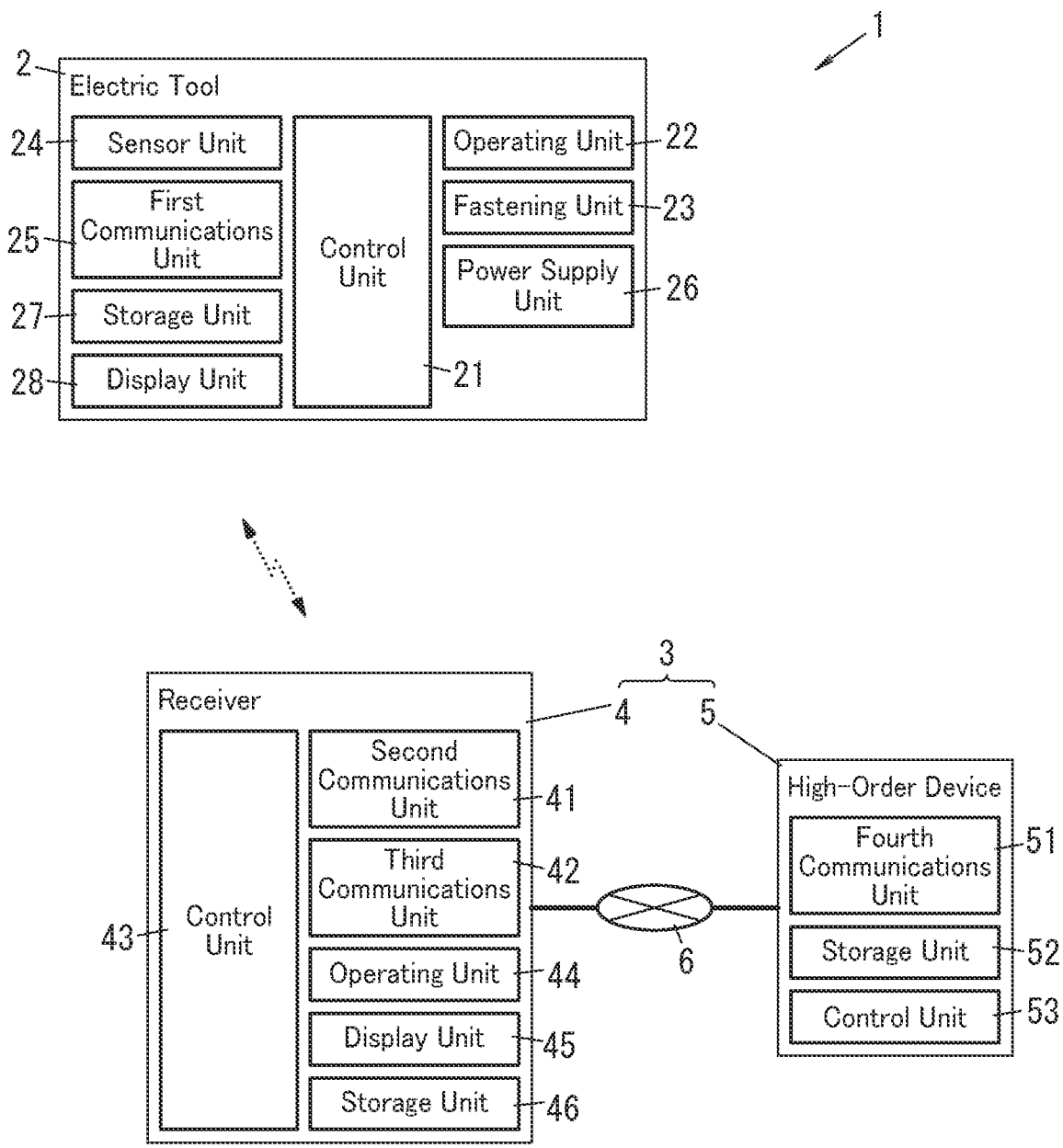
FIG. 2 is a schematic block diagram of the electric tool system.

As shown in FIGS. 1 and 2, the electric tool system 1 includes an electric tool 2 and the management system 3. In the exemplary embodiment to be described below, the management system 3 includes a receiver 4 and a high-order device 5. Alternatively, the receiver 4 and the high-order device 5 may be aggregated together in a single housing.

The electric tool 2 includes a first communications unit 25 for establishing wireless communication and is used to do work on a work target.

The management system 3 includes a second communications unit 41 for communicating wirelessly with the first communications unit 25 of the electric tool 2 in order to manage the work to be done on a work target by the electric tool 2. The management system 3 makes the second communications unit 41 transmit, during a single communication session with the first communications unit 25, setting information about multiple tasks of the work to the first communications unit 25.

Meanwhile, the management system 3 includes the second communications unit 41 and a control unit 43. The second communications unit 41 communicates wirelessly with the first communications unit 25 included in the electric tool 2 for use to do work on a work target. The control unit 43 makes the second communications unit 41 transmit, during a single communication session with the first communications unit 25, setting information about multiple tasks of the work to the first communications unit 25.

As used herein, the electric tool 2 is used to do work on a work target. The electric tool 2 is a portable tool designed to be carried and held by the user when used. The "work" to be done using the electric tool 2 may be, for example, the work of fastening a fastening member such as a bolt or a nut onto a workpiece. In that case, the "work target" is the fastening member such as the bolt or nut. Speaking more specifically, the "work" as used herein is refers to machining work to be done by using the mechanical force of the electric tool 2. Note that these are only examples of the "work" to be done using the electric tool 2 and its "work target" and may be changed as appropriate.

Also, the "setting information" preferably includes information about specific details of the multiple tasks of the work to be done using the electric tool 2. For example, it is preferable that the setting information include multiple pieces of work-by-work information respectively corresponding to the multiple tasks of the work and that each piece of the work-by-work information include information about the specific details of its corresponding task of the work. A single piece of work-by-work information is information about the specific details of the work to be done in one process by using the electric tool 2. As used herein, the "process" may refer to both a single work process in which a single independent task of the work is performed on a single work target and a so-called "batch work" process consisting of a plurality of work process steps, each of which requires a single task (i.e., unitary work) to be performed on a corresponding one of multiple work targets. That is to say, the batch work process requires a task (unitary work) with the same specific details to be performed on the multiple work targets as many times as the number of the work targets. The number of the steps included in the "process" varies according to the number of the given work target(s). Specifically, if there is only one work target (i.e., when a single work process needs to be performed), the "process" is done by performing the task only once in a single process step. On the other hand, when a batch work process needs to be performed, the "process" is done by performing the task with the same specific details the same number of times, in the same number process steps, as the number of the work targets. If the work to be done using the electric tool 2 is the work of fastening a fastening member, then the setting information preferably includes information about a fastening torque. The information about the fastening torque may be, for example, a fastening torque setting (torque value) or the number of times the impact is applied if the electric tool 2 is an impact tool. Also, if the work to be done using the electric tool 2 is the batch work requiring unitary work having predetermined specific details to be performed continuously multiple times, the setting information preferably includes: batch work information about the specific details of the unitary work; and number of times information about the number of times the unitary work is required to be performed continuously. As used herein, "to have unitary work done continuously multiple times" naturally refers to doing the unitary work repeatedly without a break but may also refer to doing the unitary work a number of times at intervals unless another type of work intervenes.

Also, as used herein, if the second communications unit 41 transmits, during a single communication session with the first communications unit 25, the setting information to the first communications unit 25, this means that the second communications unit 41 transmits transmission data including the setting information to the first communications unit 25 during a single transmission period in which the second communications unit 41 transmits data to the first communications unit 25.

This embodiment allows the first communications unit 25 of the electric tool 2 to receive, during a single communication session with the second communications unit 41, setting information about multiple tasks of the work from the second communications unit 41. This enables, even if communication between the electric tool 2 and the management system 3 is interrupted, the electric tool 2 to perform the multiple tasks of the work based on the setting information that the electric tool 2 has received before the communication is interrupted. This reduces the chances of the work that uses the electric tool 2 being delayed significantly, thus arresting a decline in the efficiency of the work that needs to be done using the electric tool 2. Thereafter, when the communication between the electric tool 2 and the management system 3 is reestablished while the multiple tasks of the work are being performed using the electric tool 2, the electric tool 2 may newly receive setting information from the management system 3. The electric tool 2 may have the multiple tasks of the work done based on the newly received setting information. This may reduce the chances of causing a decline in the efficiency of the work to be done using the electric tool 2. In addition, the second communications unit 41 of the receiver 4 transmits, during a single communication session, the setting information about multiple tasks of the work. This may reduce the number of times the communication needs to be established between the receiver 4 and the electric tool 2 to transmit the setting information from the receiver 4 to the electric tool 2, thus reducing the chances of failing to transmit the setting information.

(2) Details

Next, the electric tool system 1 according to an exemplary embodiment and the management system 3 included in the electric tool system 1 will be described in further detail.

(2.1) Configuration

A configuration for the electric tool system 1 will be described with reference to FIGS. 1-3.

The electric tool system 1 according to this embodiment may be used, for example, in an assembly line for performing assembling work of products at a factory. Note that the electric tool system 1 is not necessarily used in the assembly line at a factory but may also be used for any other purpose. For example, the electric tool system 1 may also be used to build a building at a construction site of building work.

As shown in FIG. 1, the electric tool system 1 includes the electric tool 2 and the management system 3. The management system 3 includes the receiver 4 and the high-order device 5. In this embodiment, the receiver 4 and the high-order device 5 are connected together via a wired network 6 such as Ethernet®. Although only one electric tool 2 is illustrated in FIG. 1, the number of the electric tools 2 with which the single receiver 4 may communicate does not have to be one but may also be two or more and changed as appropriate. Likewise, although only one receiver 4 is illustrated in FIG. 1, a plurality of receivers 4 may be connected to the single high-order device 5 and the number of the receivers 4 provided may be changed as appropriate.

Next, the respective devices that form the electric tool system 1 will be described in further detail with reference to FIG. 2.

(2.1.1) Electric Tool

As shown in FIG. 2, the electric tool 2 includes a control unit 21, an operating unit 22, a fastening unit 23, a sensor unit 24, the first communications unit 25, a power supply unit 26, a storage unit 27, and a display unit 28.

Figure 3:
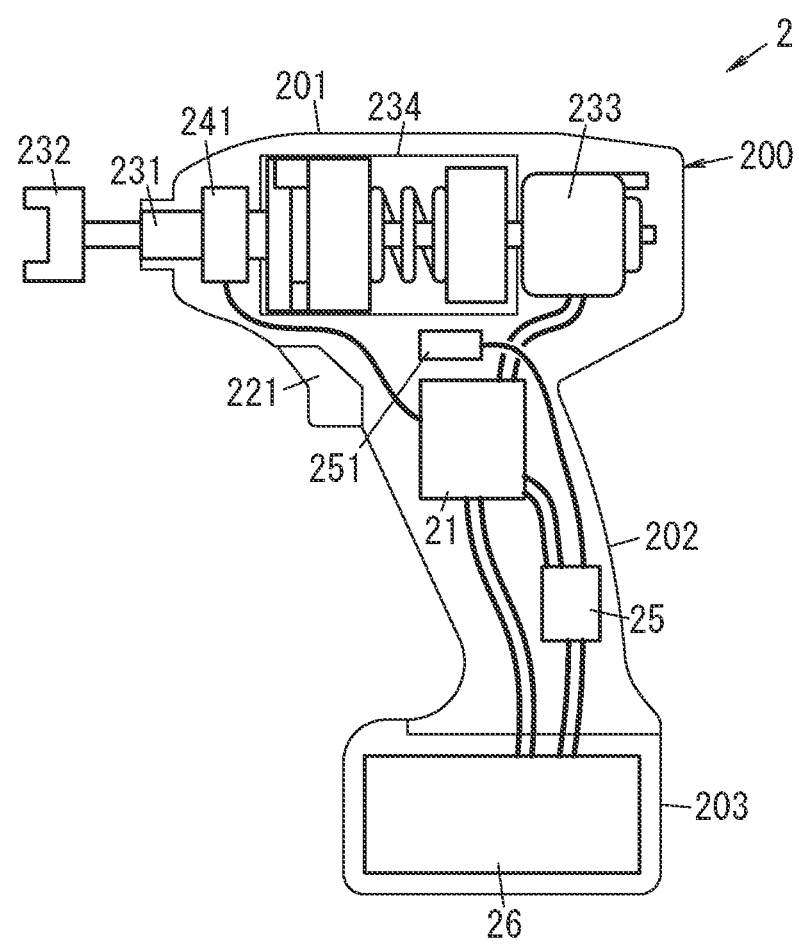
FIG. 3 is a schematic representation illustrating an exemplary electric tool included in the electric tool system.

Also, as shown in FIG. 3, the electric tool 2 includes a body 200 in which respective members are housed or held. The body 200 includes a cylindrical barrel 201 and a grip 202 protruding radially from a peripheral surface of the barrel 201. An output shaft 231 protrudes from one axial end of the barrel 201. The output shaft 231 is provided with a socket 232, to which a tip tool (such as a torque wrench bit) is attached removably and selectively according to the type of the fastening member as the work target. To one end (lower end in FIG. 3), a battery pack 203, housing the power supply unit 26 in a resin case, is attached removably.

The control unit 21 controls the operation of the fastening unit 23, the sensor unit 24, the first communications unit 25, and other units. The control unit 21 is implemented as a computer system including one or more processors and a memory. The computer system performs the functions of the control unit 21 by making the one or more processors execute a program stored in the memory. In this embodiment, the program is stored in advance in the memory of the control unit 21. Alternatively, the program may also be downloaded via a telecommunications line such as the Internet or distributed after having been stored in a non-transitory storage medium such as a memory card. The control unit 21 may be implemented as, for example, a field-programmable gate array (FPGA) or an application specific integrated circuit (ASIC). A microcontroller (such as a circuit board) performing the functions of the control unit 21 may be housed inside the grip 202, for example.

The operating unit 22 includes a trigger switch 221 provided for the grip 202. When the trigger switch 221 is pulled by the user, for example, an operating signal, of which the magnitude is proportional to the manipulative variable of the trigger switch 221 (i.e., the depth to which the trigger switch 221 has been pulled), is supplied to the control unit 21. In response to the operating signal supplied from the operating unit 22, the control unit 21 adjusts the velocity of a motor 233 by controlling the fastening unit 23 such that the motor 233 rotates at a velocity corresponding to the operating signal.

The fastening unit 23 includes not only the motor 233 but also a driver circuit (not shown), an impact mechanism 234, and the output shaft 231. The driver circuit controls the rotation of the motor 233 in accordance with a control signal supplied from the control unit 21. The rotational power of the motor 233 is transmitted to the output shaft 231 via the impact mechanism 234. If the output torque is equal to or less than a predetermined level, the impact mechanism 234 reduces the rotational velocity of the output shaft of the motor 233 and transmits reduced rotational power to the output shaft 231. The impact mechanism 234 is configured to, when the output torque exceeds the predetermined level, apply impacting force to the output shaft 231 to turn the fastening member (such as a bolt) as the work target. As shown in FIG. 3, the motor 233 and the impact mechanism 234 are housed inside the barrel 201.

The sensor unit 24 measures the fastening torque applied by the fastening unit 23. The sensor unit 24 may include, for example, a magnetostrictive torque sensor 241 mounted on the output shaft 231. The magnetostrictive torque sensor 241 makes a coil, which is disposed in a non-rotating portion, detect a variation in magnetic permeability responsive to the strain caused upon the application of a torque to the output shaft of the motor 233 and outputs a voltage signal proportional to the strain. In this manner, the sensor unit 24 measures the torque applied to the output shaft 231. That is to say, the sensor unit 24 measures the torque (fastening torque) applied by the electric tool 2 to the work target. The sensor unit 24 outputs the torque (fastening torque) thus measured to the control unit 21. Note that the sensor unit 24 does not have to include the magnetostrictive torque sensor 241 but the configuration of the sensor unit 24 may be changed as appropriate.

The control unit 21 controls the fastening unit 23 such that the fastening torque comes to have a torque setting to be set in accordance with the setting information. When finding that the fastening torque measured by the torque sensor 241 has reached the torque setting, for example, the control unit 21 stops rotating the motor 233. Note that the torque setting is changeable and may be changed by the control unit 21 in accordance with the setting information transmitted from the receiver 4 to the electric tool 2.

The first communications unit 25 is a communications module for establishing short-range wireless communication compliant with the Wi-Fi® protocol, for example. The first communications unit 25 may communicate wirelessly with the receiver 4 in accordance with this type of communications protocol. Alternatively, the wireless communication between the first communications unit 25 and the receiver 4 may also be wireless communication that uses radio waves as a transmission medium and is compliant with a communications protocol such as the Specified Low Power Radio (radio station that requires no licenses) on the 920 MHz band or Bluetooth® protocol. For example, the first communications unit 25 is housed inside the grip 202 and an antenna 251 of the first communications unit 25 is housed inside the barrel 201.

The power supply unit 26 includes a storage battery. The power supply unit 26 is housed inside the battery pack 203. The battery pack 203 is configured to house the power supply unit 26 inside a resin case. The storage battery of the power supply unit 26 may be charged by removing the battery pack 203 from the grip 202 and connecting the battery pack 203 thus removed to a charger. The power supply unit 26 supplies power required to operate an electric circuit including the control unit 21 and the motor 233 with the power stored in the storage battery.

Examples of the storage unit 27 include a read-only memory (ROM), a random-access memory (RAM), and a nonvolatile memory. Examples of the nonvolatile memory include an electrically erasable programmable read-only memory (EEPROM) and a flash memory. The storage unit 27 stores a control program to be executed by the control unit 21. In addition, the storage unit 27 also stores the setting information received from the management system 3 and work information about the work that has been done in accordance with the setting information. The work information may be, for example, information indicating that the work has been done or information about the result of the work that has been done. If the work to be done is the work of fastening a fastening member, then information about the result of the work that has been done preferably includes, for example, a value of the fastening torque measured by the sensor unit 24 and the number of the fastening members on which the fastening work has been done (hereinafter referred to as "the number of finished members"). Furthermore, the storage unit 27 also stores identification information assigned to the respective electric tools 2 and information (tool model information) about the models of the respective electric tools 2 (e.g., information about the manufacturer, the product number assigned by the manufacturer, and other attributes). In this case, the identification information preferably includes IP addresses assigned to the respective electric tools 2, for example.

The display unit 28 includes, for example, a two-digit seven-segment light-emitting diode (LED) which is provided to be exposed on the surface of the body 200. The display unit 28 also includes, for example, a blue LED and a red LED, which are provided to be exposed on the surface of the body 200.

(2.1.2) Receiver

As shown in FIG. 2, the receiver 4 includes the second communications unit 41, a third communications unit 42, the control unit 43, an operating unit 44, a display unit 45, and a storage unit 46.

The control unit 43 controls the operation of the second communications unit 41, the third communications unit 42, the display unit 45, and other units. The control unit 43 is implemented as a computer system including one or more processors and a memory. The computer system performs the functions of the control unit 43 by making the one or more processors execute a program stored in the memory. In this embodiment, the program is stored in advance in the memory of the control unit 43. Alternatively, the program may also be downloaded via a telecommunications line such as the Internet or distributed after having been stored in a non-transitory storage medium such as a memory card. The control unit 43 may be implemented as, for example, an FPGA or an ASIC.

The second communications unit 41 is a communications module for establishing short-range wireless communication compliant with the same communications protocol (such as the Wi-Fi® protocol) as the first communications unit 25 of the electric tool 2, for example. The second communications unit 41 communicates wirelessly with the first communications unit 25 of the electric tool 2.

The third communications unit 42 is a communications module for establishing wired communication via a communications line. The third communications unit 42 communicates with a fourth communications unit 51 of the high-order device 5 via a wired network 6 such as the Ethernet®.

The operating unit 44 includes, for example, an operating switch that accepts the user's operating command.

The display unit 45 includes, for example, a plurality of light-emitting diodes (LEDs) and indicates the operating state of the receiver 4 by turning ON or OFF or flickering the LEDs. Optionally, the display unit 45 may include a display device such as a liquid crystal display.

Examples of the storage unit 46 include a ROM, a RAM, and a nonvolatile memory (such as an EEPROM or a flash memory). The storage unit 46 stores the setting information to be transmitted to each electric tool 2, the work information received from the electric tool 2, and other pieces of information in association with the identification information of the electric tool 2. This allows the storage unit 46 to store, with respect to each of a plurality of electric tools 2, the setting information to be transmitted to the electric tool 2 and the work information received from the electric tool 2. In addition, the storage unit 46 also stores other pieces of information including the identification information assigned to each receiver 4 and information about the model of the receiver 4 (e.g., information about the manufacturer, the product number assigned by the manufacturer, and other attributes). In this case, the identification information includes an IP address assigned to the receiver 4, for example.

(2.1.3) High-Order Device

The high-order device 5 may be a server, for example. The high-order device 5 includes the fourth communications unit 51, a storage unit 52, and a control unit 53.

The fourth communications unit 51 is a communications module for establishing wired communication via a communications line. The fourth communications unit 51 communicates with the third communications unit 42 of the receiver 4 via the wired network 6 such as the Ethernet®.

Examples of the storage unit 52 include a ROM, a RAM, and a nonvolatile memory (such as an EEPROM or a flash memory). The storage unit 52 stores, with respect to each of the plurality of electric tools 2, the setting information for the work to be done using the electric tool 2, the history of the work information about the work that has been done using the electric tool 2, and other pieces of information in association with the identification information of the electric tool 2.

The control unit 53 controls the operation of the fourth communications unit 51 and other units. The control unit 53 is implemented as a computer system including one or more processors and a memory. The computer system performs the functions of the control unit 53 by making the one or more processors execute a program stored in the memory. In this embodiment, the program is stored in advance in the memory of the control unit 53. Alternatively, the program may also be downloaded via a telecommunications line such as the Internet or distributed after having been stored in a non-transitory storage medium such as a memory card. The control unit 53 may be implemented as, for example, an FPGA or an ASIC.

The control unit 53 makes the fourth communications unit 51 transmit setting information about the work to be done by the electric tool 2 to the receiver 4.

In addition, the control unit 53 also makes the storage unit 52 store the history of the work information, received by the fourth communications unit 51 from the receiver 4, about the work that has been done by the electric tool 2.

(2.2) Operation

Next, it will be described with reference to FIG. 4 and other drawings how the electric tool system 1 operates.

Figure 4:
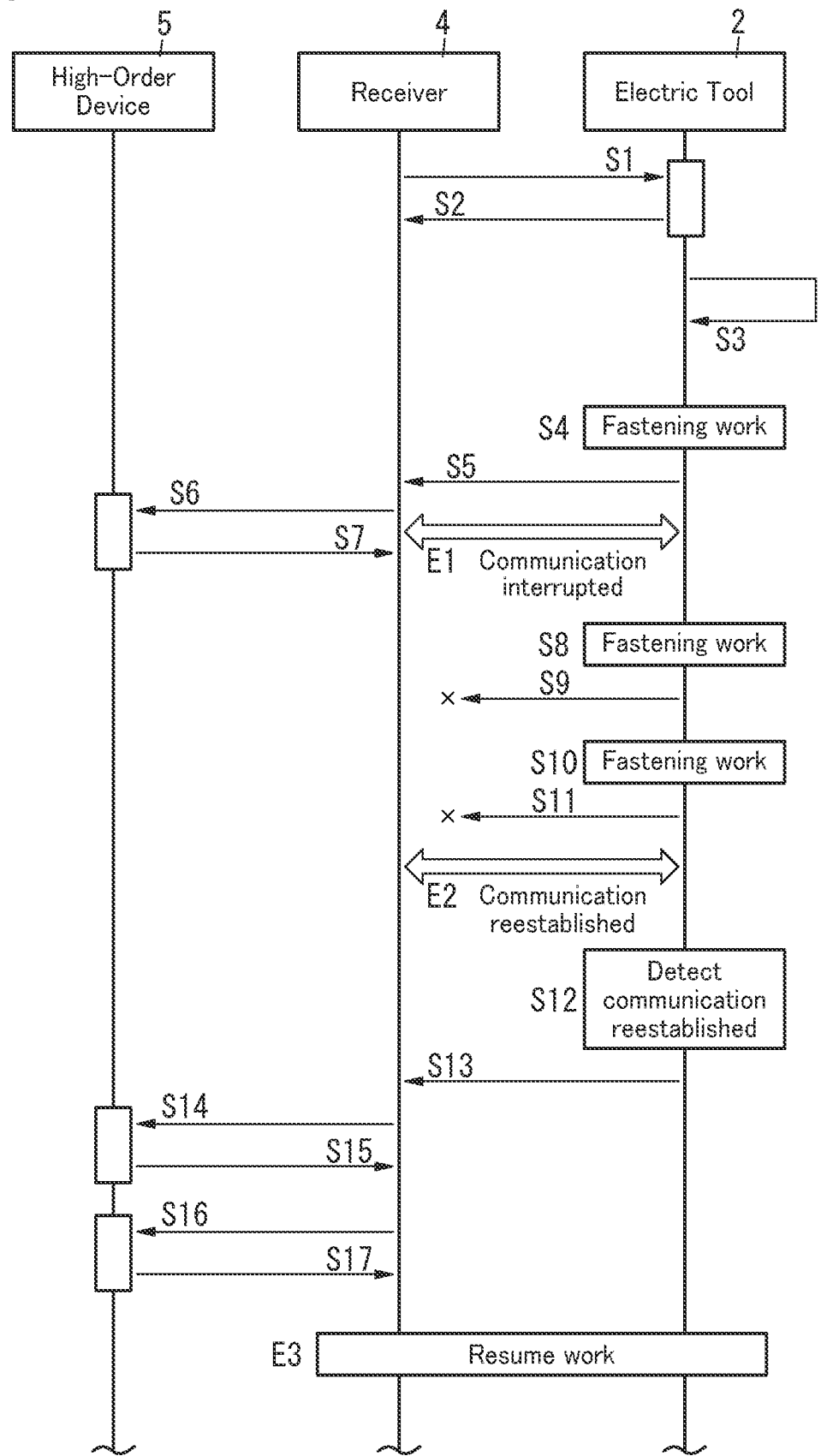
FIG. 4 is a sequence chart illustrating how the electric tool system works.

FIG. 4 is a sequence chart showing a series of operations in which the receiver 4 transmits the setting information to one of a plurality of electric tools 2, the user performs the work using the electric tool 2 that has received the setting information, and then the electric tool 2 transmits work information, indicating that the work has been done, to the receiver 4. Note that the sequence chart shown in FIG. 4 shows only an exemplary procedure of the operation of the electric tool system 1 according to this embodiment. Rather, the processing steps shown in FIG. 4 may be performed in a different order, an additional processing step may be performed, or any of the processing steps may be omitted as appropriate.

In the storage unit 46 of the receiver 4, information about the specific details of multiple tasks of the work to be done using the electric tool 2 is supposed to be stored. This information may be the information that has been entered through the operating unit 44 of the receiver 4 or the information received from the high-order device 5, whichever is appropriate. Also, in the following description of the operation, in an initial state where the fastening work starts to be performed using the electric tool 2, wireless communication is supposed to be readily established between the receiver 4 and the electric tool 2.

Figure 5:
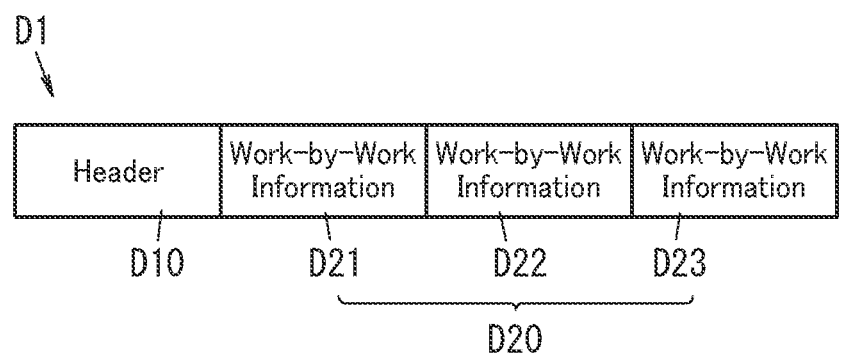
FIG. 5 schematically shows an exemplary data structure of transmission data to be transmitted from a management system to the electric tool in the electric tool system.

To have the work using the electric tool 2 started, the control unit 43 of the receiver 4 reads, from the storage unit 46, information about the specific details of multiple (e.g., three) tasks of the work that is going to be performed using the electric tool 2. Then, the control unit 43 of the receiver 4 generates transmission data including setting information about the multiple tasks of the work and makes the second communications unit 41 transmit the transmission data to the electric tool 2 (in Step S1). FIG. 5 schematically shows an exemplary data structure of the transmission data D1 to be transmitted from the receiver 4 to the electric tool 2. The transmission data D1 includes a header D10 and the setting information D20. The header D10 includes, for example, identification information of the receiver 4 as the source and identification information of the electric tool 2 as the destination. The setting information D20 includes information about the specific details of the multiple (e.g., three) tasks of the work. In this example, the setting information D20 includes multiple (three) pieces of work-by-work information D21-D23 respectively corresponding to the multiple (three) tasks of the work. Each of the multiple pieces of work-by-work information D21-D23 is information about the specific details of its associated task of the work and may include, for example, information about a fastening torque setting.

When the first communications unit 25 of the electric tool 2 receives the transmission data D1 from the receiver 4, the control unit 21 makes the first communications unit 25 transmit a response signal to the receiver 4 as the source (in Step S2). In addition, the control unit 21 also has the setting information included in the transmission data D1 stored in the nonvolatile memory included in the storage unit 27 (in Step S3) and makes the display unit 28 indicate that the work is ready to be performed in accordance with the setting information. Note that if the storage unit 27 stores no setting information about the work to be newly performed, then the control unit 21 of the electric tool 2 does not activate the fastening unit 23 even if the operating unit 22 is operated and makes the display unit 28 indicate that the electric tool 2 is not yet ready to start performing the new work. Optionally, the control unit 21 may also make the seven-segment LED of the display unit 28 indicate the number of the tasks of the work that may be newly performed, i.e., the number (e.g., three) of the fastening members on which the fastening work may be performed.

As the user performs the fastening work of fastening the fastening member using the electric tool 2 with the setting information stored in the storage unit 27 of the electric tool 2, the electric tool 2 fastens the fastening member in accordance with the work-by-work information D21-D23 included in the setting information. The setting information includes three pieces of the work-by-work information D21-D23 about three tasks of the work. Thus, as the user sequentially performs the three tasks of the fastening work of fastening the three fastening members using the electric tool 2, the control unit 21 of electric tool 2 sequentially reads out the work-by-work information D21-D23 from the storage unit 27 and has the (three process steps of the) fastening work performed on the fastening members by controlling the fastening unit 23 in accordance with the work-by-work information that has been read out. In the following description, it will be described how the electric tool system 1 operates when performing the fastening work using the electric tool 2.

When the user operates the operating unit 22 of the electric tool 2 to perform fastening work on the first fastening member after the electric tool 2 has received the setting information, the control unit 21 of the electric tool 2 controls the fastening unit 23 to perform the fastening work on the fastening member with the fastening torque defined by the work-by-work information D21, thereby having the fastening work performed (in Step S4). At this time, the sensor unit 24 measures the fastening torque of the fastening member and the control unit 21 has the fastening torque measured value stored in the nonvolatile memory included in the storage unit 27. In addition, the control unit 21 decreases by one the number of the fastening members yet to be subjected to the fastening work and has the number of the remaining fastening members (e.g., two) indicated by the seven-segment LED of the display unit 28. Furthermore, the control unit 21 makes the first communications unit 25 transmit work information including the fastening torque measured value to the receiver 4 (in Step S5). Upon receiving a response signal from the receiver 4, for example, the control unit 21 decides that transmission of the work information in Step S5 have been done successfully.

When the second communications unit 41 of the receiver 4 receives the work information from the electric tool 2, the control unit 43 makes the storage unit 46 store the work information in association with the identification information of the electric tool 2 and also makes the third communications unit 42 transmit the work information and the identification information of the electric tool 2 to the high-order device 5 (in Step S6). When the fourth communications unit 51 of the high-order device 5 receives the work information and the identification information of the electric tool 2 from the receiver 4, the control unit 53 makes the storage unit 52 store the work information in association with the identification information of the electric tool 2 and also makes the fourth communications unit 51 transmit a response signal to the receiver 4 (in Step S7). When the third communications unit 42 of the receiver 4 receives the response signal from the high-order device 5, the control unit 43 decides that the transmission of the work information and the identification information of the electric tool 2 to the high-order device 5 have been done successfully. Note that unless the third communications unit 42 of the receiver 4 receives any response signal from the high-order device 5, the control unit 43 preferably makes the third communications unit 42 re-transmit the work information and the identification information of the electric tool 2 to the high-order device 5.

Suppose a situation where the wireless communication between the electric tool 2 and the receiver 4 is interrupted due to, for example, deterioration of the communication environment after the electric tool 2 has done the fastening work on the first fastening member. Such a situation will be hereinafter referred to as an "even E1."

Since the wireless communication between the electric tool 2 and the receiver 4 is interrupted, the electric tool 2 cannot newly receive any setting information from the receiver 4 but has already received the work-by-work information D21-D23 of three tasks of the work in Step S1. This allows the electric tool 2 to perform fastening work on the second and third fastening members in accordance with the work-by-work information D22 and D23 about the fastening work on the second and third fastening members.

When the user operates the operating unit 22 of the electric tool 2 to perform fastening work on the second fastening member, the control unit 21 of the electric tool 2 controls the fastening unit 23 to perform the fastening work on the fastening member with the fastening torque defined by the work-by-work information D22, thereby having the fastening work performed (in Step S8). At this time, the sensor unit 24 measures the fastening torque of the fastening member and the control unit 21 has the fastening torque measured value stored in the nonvolatile memory included in the storage unit 27. In addition, the control unit 21 decreases by one the number of the fastening members yet to be subjected to the fastening work and has the number of the remaining fastening members (e.g., one) indicated by the seven-segment LED of the display unit 28. Furthermore, the control unit 21 makes the first communications unit 25 attempt to transmit work information including the fastening torque measured value to the receiver 4 (in Step S9). However, since the wireless communication between the electric tool 2 and the receiver 4 is still interrupted, the receiver 4 cannot receive the work information about the second fastening member. Since no response signal can be received from the receiver 4, for example, the control unit 21 decides that transmission of the work information in Step S9 have failed.

Thereafter, when the user operates the operating unit 22 of the electric tool 2 to perform fastening work on the third fastening member, the control unit 21 of the electric tool 2 controls the fastening unit 23 to perform the fastening work on the fastening member with the fastening torque defined by the work-by-work information D23, thereby having the fastening work performed (in Step S10). At this time, the sensor unit 24 measures the fastening torque of the fastening member and the control unit 21 has the fastening torque measured value stored in the nonvolatile memory included in the storage unit 27. Furthermore, the control unit 21 makes the first communications unit 25 attempt to transmit work information including the fastening torque measured value to the receiver 4 (in Step S11). However, since the wireless communication between the electric tool 2 and the receiver 4 is still interrupted, the receiver 4 cannot receive the work information about the third fastening member. Since no response signal can be received from the receiver 4, for example, the control unit 21 decides that transmission of the work information in Step S11 have failed.

In addition, the control unit 21 also decreases by one the number of the fastening members yet to be subjected to the fastening work and has the number of the remaining fastening members (e.g., zero) indicated by the seven-segment LED of the display unit 28. Since the number of the remaining fastening members has become zero at this time, the control unit 21 makes the display unit 28 indicate that no work using the electric tool 2 can be performed any longer. Note that after the electric tool 2 has the multiple (e.g., three) tasks of the work all done in accordance with the setting information received in Step S1, the electric tool 2 waits for setting information to be newly transmitted from the receiver 4.

Suppose a situation where the wireless communication between the electric tool 2 and the receiver 4 is reestablished due to improvement of the communication environment after the electric tool 2 has done the fastening work on the third fastening member. Such a situation will be hereinafter referred to as an "even E2."

The second communications unit 41 of the receiver 4 transmits a beacon signal at regular intervals to the first communications unit 25 of the electric tool 2 to see if the first communications unit 25 is still alive, for example. Upon receiving the beacon signal, the first communications unit 25 of the electric tool 2 transmits a beacon response to the second communications unit 41 of the receiver 4. In this case, when the first communications unit 25 of the electric tool 2 receives the beacon signal from the receiver 4, the control unit 21 of the electric tool 2 detects that the communication with the receiver 4 has been reestablished and performs the processing of transmitting the work information yet to be transmitted to the receiver 4. Specifically, the control unit 21 of the electric tool 2 reads the work information that has failed to be transmitted in Steps S9 and S11 (i.e., the work information about the second and third fastening members) from the storage unit 27 and makes the first communications unit 25 transmit the work information to the receiver 4 (in Step S13). In this case, the control unit 21 of the electric tool 2 preferably makes the first communications unit 25 transmit, to the receiver 4, the work information about the multiple tasks of the work in the order in which those tasks of the work have been done.

Optionally, at the timing when the next fastening work has been done after the communication with the receiver 4 has been reestablished, the control unit 21 of the electric tool 2 may collectively transmit, to the receiver 4, the work information that has failed to be transmitted so far and the work information about the fastening work that has been newly done.

Also, in a situation where the communication with the receiver 4 has been reestablished, upon receiving a request signal from the receiver 4, the control unit 21 of the electric tool 2 may transmit, to the receiver 4, the work information that has failed to be transmitted before. The second communications unit 41 of the receiver 4 transmits a beacon signal at regular intervals to the electric tool 2 to see if the electric tool 2 is still alive, for example. When the second communications unit 41 receives a beacon response from the electric tool 2, the control unit 43 of the receiver 4 decides that the receiver 4 be ready to communicate with the electric tool 2. Upon deciding that a state where communication with the first communications unit 25 of the electric tool 2 is interrupted have changed into a state where the communication with the first communications unit 25 has been reestablished, the control unit 43 of the receiver 4 makes the second communications unit 41 transmit a request signal, requesting that the work information yet to be transmitted be transmitted, to the electric tool 2. When the first communications unit 25 of the electric tool 2 receives the request signal from the receiver 4, the control unit 21 of the electric tool 2 reads, from the storage unit 27, the work information that has failed to be transmitted in Steps S9 and S11 (i.e., the work information about the second and third fastening members) and makes the first communications unit 25 transmit the work information to the receiver 4. This allows the receiver 4 to receive, after the communication has been reestablished, the work information that failed to be received from the electric tool 2 due to, for example, deterioration of the communication environment.

When the second communications unit 41 of the receiver 4 receives the work information about the second and third fastening members from the electric tool 2, the control unit 43 makes the storage unit 46 store the work information about the second and third fastening members in association with the identification information of the electric tool 2. In addition, the control unit 43 also makes the third communications unit 42 transmit, to the high-order device 5, the work information about the second and third fastening members and the identification information of the electric tool 2 in the order in which the two tasks of the work have been done.

Specifically, the control unit 43 makes the third communications unit 42 transmit, first, the work information about the second fastening member and the identification information of the electric tool 2 to the high-order device 5 (in Step S14). When the fourth communications unit 51 of the high-order device 5 receives, from the receiver 4, the work information about the second fastening member and the identification information of the electric tool 2, the control unit 53 makes the storage unit 52 store the work information about the second fastening member in association with the identification information of the electric tool 2 and makes the fourth communications unit 51 transmit a response signal to the receiver 4 (in Step S15).

When the third communications unit 42 of the receiver 4 receives the response signal from the high-order device 5, the control unit 43 of the receiver 4 makes the third communications unit 42 transmit the work information about the third fastening member and the identification information of the electric tool 2 to the high-order device 5 (in Step S16). When the fourth communications unit 51 of the high-order device 5 receives, from the receiver 4, the work information about the third fastening member and the identification information of the electric tool 2, the control unit 53 makes the storage unit 52 store the work information about the third fastening member in association with the identification information of the electric tool 2 and makes the fourth communications unit 51 transmit a response signal to the receiver 4 (in Step S17).

When the third communications unit 42 of the receiver 4 receives the response signal from the high-order device 5, the control unit 43 of the receiver 4 decides that the transmission of the work information have succeeded and makes the second communications unit 41 transmit new setting information to the electric tool 2, thereby having the work using the electric tool 2 resumed. Such a situation will be hereinafter referred to as an "event E3."

Note that the sequence chart of FIG. 4 illustrates a sequence of operations to be performed in a situation where after the electric tool 2 has done the fastening work of fastening three fastening members in accordance with the three pieces of work-by-work information D21-D23 included in the setting information received from the receiver 4, the communication between the electric tool 2 and the receiver 4 has been reestablished. In such a situation, upon receiving new setting information from the receiver 4 after the communication between the electric tool 2 and the receiver 4 has been reestablished, the electric tool 2 resumes performing the work in accordance with the new setting information.

On the other hand, if the communication between the electric tool 2 and the receiver 4 has been reestablished when the electric tool 2 that has received the setting information including multiple pieces of work-by-work information from the receiver 4 has not yet done the fastening work of fastening a plurality of fastening members, then the electric tool 2 may continue to perform the fastening work yet to be done in accordance with the work-by-work information about the work yet to be done. When the electric tool 2 has done the fastening work of fastening the fastening member in accordance with the work-by-work information about the work yet to be done, the electric tool 2 transmits, to the receiver 4, the work information yet to be transmitted about the work done before and the work information about the fastening work that has been done newly.

Note that once the receiver 4 has received the work information from the electric tool 2 after the communication with the electric tool 2 has been reestablished, the receiver 4 transmits new setting information to the electric tool 2 at an appropriate timing. This allows the electric tool 2 to continuously perform the fastening work in accordance with the newly received setting information after having done the remaining fastening work in accordance with the work-by-work information about the work yet to be done.

As can be seen from the foregoing description, according to this embodiment, the receiver 4 transmits, during a single communication session with the electric tool 2, setting information about multiple tasks of the work to the electric tool 2. This allows, even if the wireless communication between the receiver 4 and the electric tool 2 is interrupted, the electric tool 2 to perform the work in accordance with the setting information about the multiple tasks of the work. This reduces the chances of the work that uses the electric tool 2 being stopped or delayed significantly, thus arresting a decline in the efficiency of the work that needs to be done using the electric tool 2.

In addition, every time the electric tool 2 has done a single task of the work on the work target, the electric tool 2 makes the first communications unit 25 transmit the work information indicating that the work has been done to the second communications unit 41. This allows the management system 3 to receive, every time a single task of the work using the electric tool 2 has been done, the work information from the electric tool 2. Thus, the user may learn the result of the work using the electric tool 2 at the timing when the work has been done. Consequently, this allows the management system 3 to accurately monitor the progress of the work using the electric tool 2 and also allows, if any failure has occurred during the work using the electric tool 2, the management system 3 to cope with the situation quickly by, for example, instructing the electric tool 2 to redo the work all over again.

In the exemplary embodiment described above, the electric tool 2 transmits the work information to the management system 3 every time the electric tool 2 has done a single task of the work on the work target. However, the timing to transmit the work information may also be changed as appropriate. Alternatively, the electric tool 2 may transmit the work information about multiple tasks of the work to the management system 3 when the electric tool 2 has done those multiple tasks, of which the specific details are defined by the setting information. This enables cutting down the number of times communication needs to be established between the electric tool 2 and the management system 3.

(3) Variations

Note that the embodiment described above is only an exemplary one of various embodiments of the present disclosure and should not be construed as limiting. Rather, the exemplary embodiment may be readily modified in various manners depending on a design choice or any other factor without departing from the scope of the present disclosure. Also, the functions of the management system 3 included in the electric tool system 1 may also be implemented as a management method to be performed by the management system 3, a computer program, or a non-transitory storage medium on which the program is stored. A management method according to an aspect is a method for managing work to be done on a work target by an electric tool 2. The electric tool 2 includes a communications unit 25 that establishes wireless communication. The management method includes establishing the wireless communication with the communications unit 25. The wireless communication includes transmitting, during a single communication session with the communications unit 25, setting information about multiple tasks of the work to the communications unit 25. A (computer) program according to another aspect is designed to cause a computer system to perform the management method described above. A non-transitory storage medium according to still another aspect stores thereon a program designed to cause a computer system to perform the management method described above.

Next, variations of the exemplary embodiment will be enumerated one after another. Note that the variations to be described below may be adopted in combination as appropriate.

The electric tool system 1 according to the present disclosure (specifically, the electric tool 2, the management system 3, the receiver 4, and the high-order device 5) includes a computer system. The computer system may include, as principal hardware components, a processor and a memory. The functions of the electric tool system 1 according to the present disclosure (specifically, the electric tool 2, the management system 3, the receiver 4, and the high-order device 5) may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very-large-scale integrated circuit (VLSI), and an ultra-large-scale integrated circuit (ULSI). Optionally, an FPGA to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Also, in the embodiment described above, at least some functions of the management system 3 which are distributed in multiple devices may be aggregated together in a single housing. For example, some functions of the management system 3, which are distributed in the receiver 4 and the high-order device 5, may be aggregated together in a single housing.

The plurality of functions of the management system 3 may be aggregated together in a single housing or distributed in multiple different housings. Optionally, at least some functions of the management system 3 (e.g., some functions of the control unit 43) may be implemented as a cloud computing system as well.

(3.1) First Variation

Next, an electric tool system 1 according to a first variation will be described with reference to FIGS. 6-8. The work to be performed using the electric tool 2 includes batch work that requires unitary work having predetermined specific details to be performed continuously multiple times. In the electric tool system 1 according to the first variation, the setting information transmitted from the management system 3 to the electric tool 2 includes batch work information about the specific details of the unitary work and number of times information about the number of times the unitary work is required to be performed continuously, which is a major difference from the exemplary embodiment described above. Nevertheless, the first variation is the same as the exemplary embodiment described above except the data structure of the setting information. Thus, any constituent element of this first variation, having the same function as a counterpart of the embodiment described above, will be designated by the same reference numeral as that counterpart's, and description thereof will be omitted herein.

Figure 6:
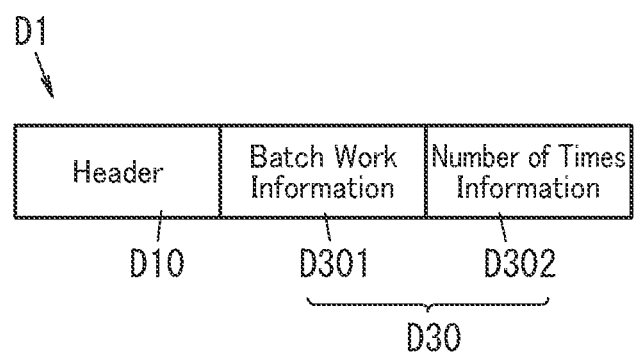
FIG. 6 schematically shows an exemplary data structure of transmission data to be transmitted from a management system to the electric tool in an electric tool system according to a first variation.

FIG. 6 is a schematic representation illustrating an exemplary data structure for transmission data D1 to be transmitted from the receiver 4 to the electric tool 2. The transmission data D1 includes a header D10 and setting information D30. The setting information D30 includes information about the specific details of multiple tasks of the work. In this variation, the setting information includes information about the specific details of the batch work and may include, for example, batch work information D301 about the specific details of the unitary work and number of times information D302 about the number of times the unitary work is required to be performed continuously. The batch work information D301 may include, for example, information about a fastening torque of a fastening member. The information about the fastening torque may be, for example, a fastening torque setting (torque value) or the number of times the impact is applied if the electric tool 2 is an impact tool. The number of times information D302 includes information about the number of times the unitary work is required to be performed continuously and includes information about the number of fastening members to be subjected to the fastening work as the batch work. If the setting information D30 includes the batch work information D301 and the number of times information D302, then the data size may be cut down and the time it takes to establish communication may be shortened advantageously, compared to a situation where the setting information D30 includes work-by-work information about respective tasks of the work.

When the first communications unit 25 of the electric tool 2 receives the transmission data D1 having the data structure shown in FIG. 6, the control unit 21 has the fastening work performed on the fastening members in accordance with the setting information included in the transmission data D1. Specifically, the control unit 21 has the fastening work performed on the fastening members by controlling the fastening unit 23 such that in each unitary work, the fastening torque comes to have the torque setting defined by the batch work information D301. In addition, the control unit 21 has the batch work done by repeatedly performing the unitary work the number of times defined by the number of times information D302.

Next, it will be described with reference to FIG. 7 how the electric tool system 1 according to the first variation operates. FIG. 7 is a sequence chart showing a series of operations in which the receiver 4 transmits the setting information to one of a plurality of electric tools 2, the user performs the work using the electric tool 2 that has received the setting information, and then the electric tool 2 transmits work information, indicating that the work has been done, to the receiver 4. Note that the sequence chart shown in FIG. 7 shows only an exemplary procedure of the operation of the electric tool system 1 according to the first variation. Rather, the processing steps shown in FIG. 7 may be performed in a different order, an additional processing step may be performed, or any of the processing steps may be omitted as appropriate.

In the storage unit 46 of the receiver 4, information about the specific details of multiple tasks of the work to be done using the electric tool 2 is supposed to be stored. This information may be the information that has been entered through the operating unit 44 of the receiver 4 or the information received from the high-order device 5, whichever is appropriate. Also, in the following description of the operation, in an initial state where the fastening work starts to be performed using the electric tool 2, wireless communication is supposed to be readily established between the receiver 4 and the electric tool 2.

To have the work using the electric tool 2 started, the control unit 43 of the receiver 4 reads, from the storage unit 46, information about the specific details of the batch work as information about the specific details of multiple tasks of the work that is going to be performed. Then, the control unit 43 of the receiver 4 generates transmission data D1 including setting information D30 about the specific details of the batch work and makes the second communications unit 41 transmit the transmission data D1 to the electric tool 2 (in Step S21).

When the first communications unit 25 of the electric tool 2 receives the transmission data D1 from the receiver 4, the control unit 21 makes the first communications unit 25 transmit a response signal to the receiver 4 as the source (in Step S22). In addition, the control unit 21 also has the setting information D30 included in the transmission data D1 stored in the storage unit 27 (in Step S23) and makes the display unit 28 indicate that the work is ready to be performed in accordance with the setting information D30. Optionally, the control unit 21 may also make the seven-segment LED of the display unit 28 indicate, in accordance with the number of times information D302 included in the setting information D30, the number of the fastening members on which the fastening work may be performed.

When the second communications unit 41 of the receiver 4 receives a response signal from the first communications unit 25 of the electric tool 2, the control unit 43 sets, as a timeout duration, the time allowed to have the batch work done (in Step S24) and starts counting the timeout duration.

When the user operates the operating unit 22 of the electric tool 2 to perform fastening work on the fastening members with the setting information D30 stored in the storage unit 27 of the electric tool 2, the control unit 21 of the electric tool 2 has the fastening work performed by controlling the fastening unit 23 such that the fastening work is performed on the fastening members with the fastening torque defined by the batch work information D301 (in Step S25). At this time, the sensor unit 24 measures the fastening torques of the fastening members and the control unit 21 has the fastening torque measured values stored in the storage unit 27. In addition, the control unit 21 counts the number of the fastening members subjected to the fastening work (i.e., the number of finished members) and has information about the number of finished members stored in the storage unit 27. Furthermore, the control unit 21 decreases by one the number of the remaining fastening members yet to be subjected to the fastening work as batch work and has the number of remaining members indicated by the seven-segment LED of the display unit 28.

Every time a single task of fastening a fastening member is done, the control unit 21 of the electric tool 2 makes the first communications unit 25 transmit work information indicating the result of the fastening work and the identification information of the electric tool 2 to the receiver 4 (in Step S26). In this case, the work information indicating the result of the fastening work includes, for example, the fastening torque measured values and the number of finished members.

When the second communications unit 41 of the receiver 4 receives the work information and the identification information from the electric tool 2, the control unit 43 makes the storage unit 46 store the work information in association with the identification information of the electric tool 2 and also makes the third communications unit 42 transmit the work information and the identification information of the electric tool 2 to the high-order device 5 (in Step S27). When the fourth communications unit 51 of the high-order device 5 receives the work information and the identification information of the electric tool 2 from the receiver 4, the control unit 53 makes the storage unit 52 store the work information in association with the identification information of the electric tool 2 and also makes the fourth communications unit 51 transmit a response signal to the receiver 4 (in Step S28).

The electric tool 2 repeatedly performs the fastening work on the fastening members the number of times defined by the number of times information D302 (in Step S25) and performs the processing of transmitting the work information and the identification information to the receiver 4 every time the fastening work is done (in Step S26). Then, every time the receiver 4 receives the work information and the identification information from the electric tool 2, the receiver 4 transmits the work information and the identification information of the electric tool 2 to the high-order device 5. In response, the work information is stored in the storage unit 52 of the high-order device 5 in association with the identification information of the electric tool 2.

When the electric tool 2 has performed the fastening work on the fastening members the number of times defined by the number of times information D302, the electric tool 2 waits for new setting information to be transmitted from the receiver 4. Also, when finding the number of finished members included in the work information received from the electric tool 2 equal to the number of the fastening members to be fastened by the batch work, the control unit 43 of the receiver 4 decides that the batch work have been done (in Step S29). Then, the control unit 43 of the receiver 4 transmits new setting information to the electric tool 2. Upon receiving the new setting information from the receiver 4, the electric tool 2 is allowed to start performing new work in accordance with the new setting information received from the receiver 4.

Note that the control unit 43 of the receiver 4 counts the timeout duration and the high-order device 5 may be notified of an error unless the batch work is done before the timeout duration finishes being counted.

Figure 7:
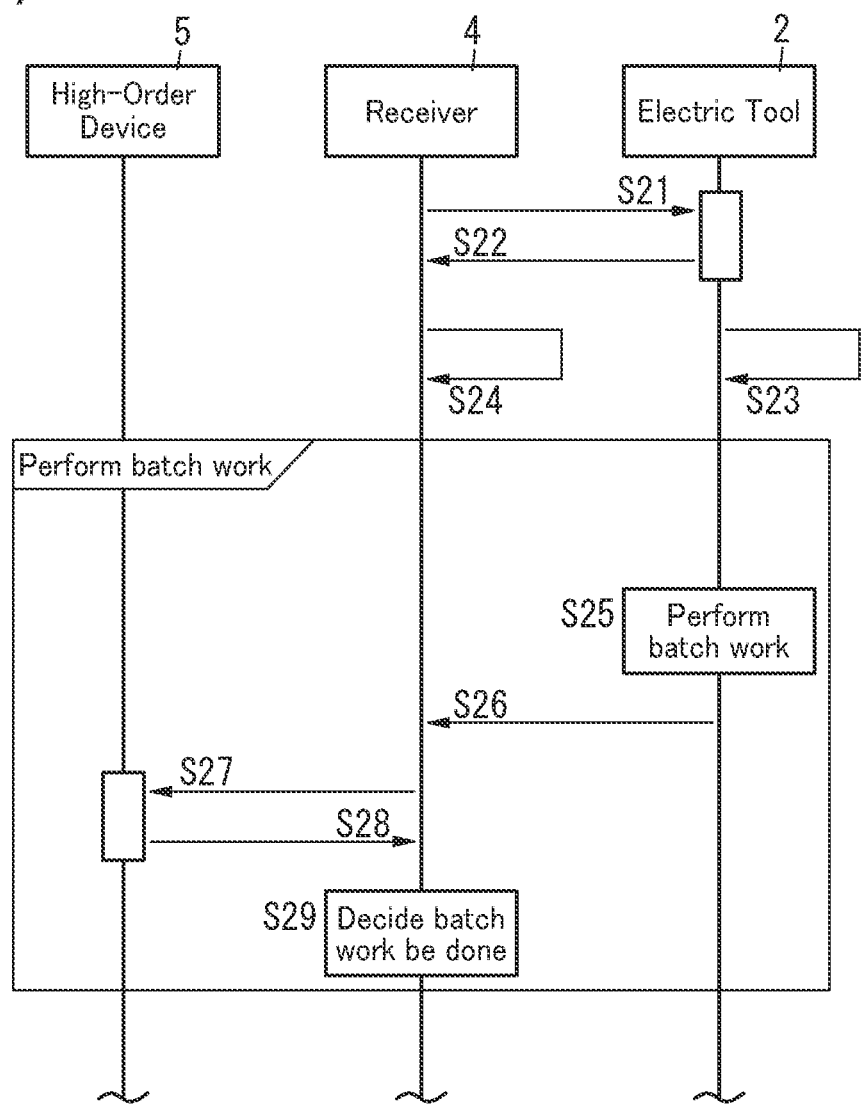
FIG. 7 is a sequence chart illustrating how the electric tool system according to the first variation works.

In the sequence chart shown in FIG. 7, the receiver 4 transmits, to the high-order device 5, the work information that the electric tool 2 has transmitted every time the electric tool 2 has done the unitary work. However, this is only an example and should not be construed as limiting. Alternatively, the timing to transmit the work information to the high-order device 5 may be changed as appropriate. For example, the receiver 4 may also transmit, at the timing when the batch work has been done, the work information about respective tasks, each of which has been performed as the unitary work of the batch work, to the high-order device 5 sequentially in the order in which the tasks have been performed.

The transmission data D1, of which the data structure is illustrated in FIG. 6, includes setting information D30 about a single set of batch work. However, this is only an example and should not be construed as limiting. Alternatively, the transmission data D1 may include setting information about multiple (e.g., two) sets of batch work as shown in FIG. 8.

Figure 8:
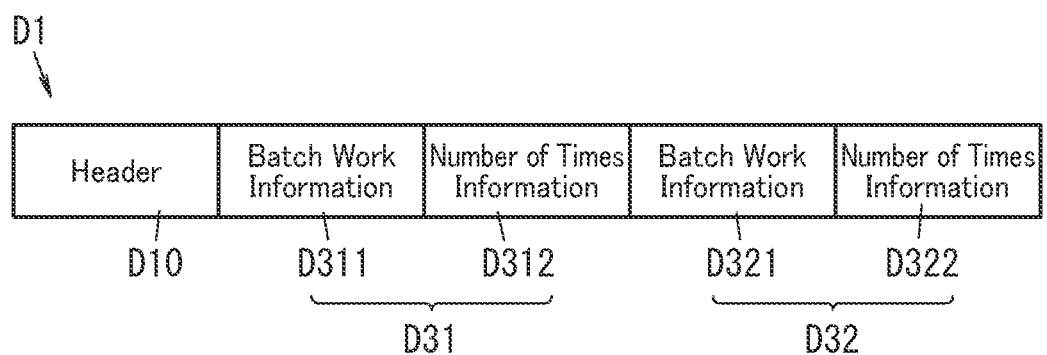
FIG. 8 schematically shows an exemplary data structure of transmission data to be transmitted from the management system to the electric tool in the electric tool system according to the first variation.

The transmission data D1, of which the data structure is illustrated in FIG. 8, includes, for example, a header D10, a first piece of setting information D31, and a second piece of setting information D32. In this example, the first piece of setting information D31 is setting information that is going to be transmitted during a current communication session and the second piece of setting information D32 is setting information to be transmitted during a next communication session. That is to say, the receiver 4 may transmit, to the electric tool 2, the transmission data D1 including the first piece of setting information D31 that is going to be transmitted during the current communication session and the second piece of setting information D32 to be transmitted during the next communication session.

In other words, the transmission data D1 that is going to be transmitted to the electric tool 2 during the current communication session includes: the first piece of setting information D31 about the work instructed to do during the current communication session; and the second piece of setting information D32 about the work to be instructed to do during the next communication session. That is to say, the transmission data D1 includes: the first piece of setting information D31 about the work to be performed this time immediately after the current communication session; and the second piece of setting information D32 about the work to be performed next time after the work instructed by the first piece of setting information D31 is done. The first piece of setting information D31 is setting information about the specific details of the batch work to be performed as the first work after the current communication session. The second piece of setting information D32 is setting information about the specific details of the batch work to be performed as the second work after the current communication session. Each of the first piece of setting information D31 and the second piece of setting information D32 includes: batch work information D311, D321 about the specific details of the unitary work to be performed as the batch work; and number of times information D312, D322 about the number of times the unitary work is performed continuously. The batch work information D311, D321 may include, for example, information about a fastening torque of a fastening member. The information about the fastening torque may be, for example, a fastening torque setting (torque value) or the number of times the impact is applied if the electric tool 2 is an impact tool. The number of times information D312, D322 includes information about the number of times the unitary work is required to be performed continuously and includes information about the number of fastening members to be subjected to the fastening work as the batch work.

As can be seen, the second communications unit 41 of the receiver 4 transmits, during a single communication session with the first communications unit 25, the first piece of setting information D31 about the batch work to be performed as the first work after the current communication session and the second piece of setting information D32 about the batch work to be performed as the second work after the current communication session. This allows the first communications unit 25 of the electric tool 2 to receive the first piece of setting information D31 and the second piece of setting information D32 from the receiver 4. This enables, even if the communication between the electric tool 2 and the receiver 4 is interrupted after the electric tool 2 has received the first piece of setting information D31 and the second piece of setting information D32 from the receiver 4 (management system 3), the electric tool 2 to perform the work continuously in accordance with the first piece of setting information D31 and the second piece of setting information D32, thus arresting a decline in the efficiency of the work that needs to be done using the electric tool 2.

In the example described above, the second communications unit 41 of the receiver 4 transmits, during a single communication session with the first communications unit 25, the transmission data including the first piece of setting information D31 and the second piece of setting information D32. However, this is only an example and should not be construed as limiting. Alternatively, the second communications unit 41 may transmit transmission data including the first piece of setting information D31 and at least a part of the second piece of setting information D32. In other words, the management system 3 may make the second communications unit 41 transmit, during the current communication session, the transmission data D1 including the first piece of setting information D31 and at least a part of the second piece of setting information D32. For example, if the second piece of setting information D32 includes multiple pieces of work-by-work information, then the receiver 4 may transmit, to the electric tool 2, transmission data including the first piece of setting information D31 and some of the multiple pieces of work-by-work information included in the second piece of setting information D32. This enables, even if the communication between the electric tool 2 and the management system 3 is interrupted, the electric tool 2 to perform the work continuously in accordance with the first piece of setting information D31 and at least a part of the second piece of setting information D32 that the electric tool 2 has received from the management system 3 before the communication is interrupted, thus arresting a decline in the efficiency of the work that needs to be done using the electric tool 2.

(3.2) Other Variations

In the exemplary embodiment described above, the management system 3 (receiver 4) may make the second communications unit 41 transmit the setting information every time work is done using the electric tool 2. The setting information includes information about multiple tasks of the work to be done using the electric tool 2. Every time a single task of the work is done using the electric tool 2, the management system 3 may make the second communications unit 41 transmit the setting information to the electric tool 2. This allows, every time a single task of the work is done using the electric tool 2, the electric tool 2 to be provided with new setting information, thus reducing the chances of the work that uses the electric tool 2 being stopped when the communication between the electric tool 2 and the management system 3 is interrupted.

Optionally, the management system 3 may transmit the new setting information to the electric tool 2 at the timing when the electric tool 2 has done those multiple tasks, of which the specific details are defined by the setting information. This enables cutting down the number of times communication needs to be established between the electric tool 2 and the management system 3.

In the exemplary embodiment described above, the electric tool 2 is an impact tool for use to perform fastening work on fastening members. However, the impact mechanism 234 is not an essential constituent element for the electric tool 2. That is to say, an electric tool 2 with no impact mechanism 234 may also be used. Furthermore, the electric tool 2 does not have to be a tool for use to perform fastening work. Alternatively, the electric tool may also be used for any type of work (such as drilling, machining, or cutting) other than fastening. Thus, the contents of the setting information may be changed as appropriate according to the intended use of the electric tool 2.

(Recapitulation)

As can be seen from the foregoing description, an electric tool system (1) according to a first aspect includes an electric tool (2) and a management system (3). The electric tool (2) includes a first communications unit (25) that establishes wireless communication. The electric tool (2) is to be used to do work on a work target. The management system (3) includes a second communications unit (41) that communicates wirelessly with the first communications unit (25) of the electric tool (2). The management system (3) makes the second communications unit (41) transmit, during a single communication session with the first communications unit (25), setting information about multiple tasks of the work to the first communications unit (25).

This aspect allows the first communications unit (25) of the electric tool (2) to receive, during a single communication session with the second communications unit (41), setting information about multiple tasks of the work from the second communications unit (41). This enables, even if communication between the electric tool (2) and the management system (3) is interrupted, the electric tool (2) to perform the multiple tasks of the work based on the setting information that the electric tool (2) has received before the communication is interrupted. This reduces the chances of the work that uses the electric tool (2) being delayed significantly, thus arresting a decline in the efficiency of the work that needs to be done using the electric tool (2).

In an electric tool system (1) according to a second aspect, which may be implemented in conjunction with the first aspect, the setting information includes multiple pieces of work-by-work information (D21-D23) about specific details of the multiple tasks of the work.

This aspect may reduce the chances of causing a decline in the efficiency of the work that needs to be done using the electric tool (2).

In an electric tool system (1) according to a third aspect, which may be implemented in conjunction with the first aspect, the work includes batch work requiring unitary work having predetermined specific details to be performed continuously multiple times. The setting information includes: batch work information (D301, D311, D321) about the specific details of the unitary work; and number of times information (D302, D312, D322) about the number of times the unitary work is required to be performed continuously.

This aspect enables cutting down not only the size of the data to be transmitted during a single communication session but also the time it takes to establish the single communication session, compared to transmitting the batch work information (D301, D311, D321) about the specific details of the unitary work repeatedly the number of times the unitary work is performed.

In an electric tool system (1) according to a fourth aspect, which may be implemented in conjunction with any one of the first to third aspects, the management system (3) makes the second communications unit (41) transmit the setting information every time the work is done using the electric tool (2).

This aspect allows the first communications unit (25) of the electric tool (2) to receive setting information about multiple tasks of the work from the second communications unit (41) every time the work is to be performed using the electric tool (2). This enables, even if communication between the electric tool (2) and the management system (3) is interrupted, the electric tool (2) to perform the multiple tasks of the work based on the setting information that the electric tool (2) has received before the communication is interrupted. This reduces the chances of causing a decline in the efficiency of the work that needs to be done using the electric tool (2).

In an electric tool system (1) according to a fifth aspect, which may be implemented in conjunction with the fourth aspect, the setting information includes: a first piece of setting information going to be transmitted by the management system (3) during a current communication session; and a second piece of setting information to be transmitted by the management system (3) during a next communication session. The management system (3) makes the second communications unit (41) transmit, during the current communication session, transmission data including the first piece of setting information and at least a part of the second piece of setting information.

According to this aspect, the management system (3) makes the second communications unit (41) transmit transmission data including the first piece of setting information and at least a part of the second piece of setting information. This enables, even if communication between the electric tool (2) and the management system (3) is interrupted, the electric tool (2) to perform the multiple tasks of the work based on the setting information that the electric tool (2) has received before the communication is interrupted. This reduces the chances of causing a decline in the efficiency of the work that needs to be done using the electric tool (2).

In an electric tool system (1) according to a sixth aspect, which may be implemented in conjunction with any one of the first to fifth aspects, the electric tool (2) makes, every time the electric tool (2) has done a single task of the work on the work target, the first communications unit (25) transmit work information, indicating that the single task of the work has been done, to the second communications unit (41).

According to this aspect, every time the electric tool (2) has done a single task of the work, the second communications unit (41) of the management system (3) receives the work information from the electric tool (2), thus allowing the user to learn, based on the work information, what work has been done using the electric tool (2).

A management system (3) according to a seventh aspect includes a communications unit (41) and a control unit (43). The communications unit (41) of the management system (3) communicates wirelessly with a communications unit (25) included in an electric tool (2). The electric tool (2) is to be used to do work on a work target. The control unit (43) makes the communications unit (41) of the management system (3) transmit, during a single communication session with the communications unit (25) of the electric tool (2), setting information about multiple tasks of the work.

This aspect allows the communications unit (25) of the electric tool (2) to receive, during a single communication session with the communications unit (41) of the management system (3), setting information about multiple tasks of the work from the communications unit (41). This enables, even if communication between the electric tool (2) and the management system (3) is interrupted, the electric tool (2) to perform the multiple tasks of the work based on the setting information that the electric tool (2) has received before the communication is interrupted. This reduces the chances of the work that uses the electric tool (2) being delayed significantly, thus arresting a decline in the efficiency of the work that needs to be done using the electric tool (2).

A management method according to an eighth aspect is a method for managing work to be done on a work target by an electric tool (2). The electric tool (2) includes a communications unit (25) that establishes wireless communication. The management method includes establishing the wireless communication with the communications unit (25). The wireless communication includes transmitting, during a single communication session with the communications unit (25), setting information about multiple tasks of the work to the communications unit (25).

This aspect allows the communications unit (25) of the electric tool (2) to receive, during a single communication session, setting information about multiple tasks of the work. This enables, even if communication with the electric tool (2) is interrupted, the electric tool (2) to perform the multiple tasks of the work based on the setting information that the electric tool (2) has received before the communication is interrupted. This reduces the chances of the work that uses the electric tool (2) being delayed significantly, thus arresting a decline in the efficiency of the work that needs to be done using the electric tool (2).

A non-transitory storage medium according to a ninth aspect stores thereon a program. The program is designed to cause a computer system to perform the management method according to the eighth aspect.

This aspect may reduce the chances of causing a decline in the efficiency of the work that needs to be done using the electric tool (2).

Note that these are not the only aspects of the present disclosure but various configurations (including their variations) of the management system (3) according to the exemplary embodiment described above may also be implemented as, for example, a method for managing the management system (3), a (computer) program, or a non-transitory storage medium on which the program is stored.

Note that the constituent elements according to the second to sixth aspects are not essential constituent elements for the electric tool system (1) but may be omitted as appropriate.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An electric tool system comprising:
an electric tool including a first communications unit configured to establish wireless communication, the electric tool being used to do work on a work target; and
a management system including a second communications unit configured to communicate wirelessly with the first communications unit of the electric tool, wherein:
the management system is configured to make the second communications unit transmit, during a single communication session with the first communications unit, setting information about multiple tasks of the work to the first communications unit,
the setting information includes multiple pieces of work-by-work information respectively corresponding to the multiple tasks of the work,
each of the multiple pieces of work-by-work information includes information about specific details of a corresponding task of the multiple tasks of the work, and
the electric tool is configured to perform the multiple tasks of the work based on the setting information.

2. The electric tool system of claim 1, wherein
the work includes batch work requiring unitary work having predetermined specific details to be performed continuously multiple times, and
the setting information includes: batch work information about the specific details of the unitary work; and number of times information about the number of times the unitary work is required to be performed continuously.

3. The electric tool system of claim 2, wherein
the management system is configured to make the second communications unit transmit the setting information every time the work is done using the electric tool.

4. The electric tool system of claim 2, wherein
the electric tool is configured to, every time the electric tool has done a single task of the work on the work target, make the first communications unit transmit work information, indicating that the single task of the work has been done, to the second communications unit.

5. The electric tool system of claim 1, wherein
the management system is configured to make the second communications unit transmit the setting information every time the work is done using the electric tool.

6. The electric tool system of claim 5, wherein
the setting information includes: a first piece of setting information going to be transmitted by the management system during a current communication session; and a second piece of setting information to be transmitted by the management system during a next communication session, and
the management system is configured to make the second communications unit transmit, during the current communication session, transmission data including the first piece of setting information and at least a part of the second piece of setting information.

7. The electric tool system of claim 6, wherein
the electric tool is configured to, every time the electric tool has done a single task of the work on the work target, make the first communications unit transmit work information, indicating that the single task of the work has been done, to the second communications unit.

8. The electric tool system of claim 5, wherein
the electric tool is configured to, every time the electric tool has done a single task of the work on the work target, make the first communications unit transmit work information, indicating that the single task of the work has been done, to the second communications unit.

9. The electric tool system of claim 1, wherein
the electric tool is configured to, every time the electric tool has done a single task of the work on the work target, make the first communications unit transmit work information, indicating that the single task of the work has been done, to the second communications unit.

10. The electric tool system of claim 1, wherein:
the multiple tasks of the work include a first process performed under first setting information and a second process performed under second setting information different from the first setting information,
the setting information includes the first setting information and the second setting information, both transmitted during the single communication session,
the electric tool is configured to perform the first process and the second process based on the first setting information and the second setting information, respectively, and
the first communications unit of the electric tool receives no setting information between performing the first process and performing the second process.

11. A management system comprising:
a communications unit configured to communicate wirelessly with a communications unit included in an electric tool, the electric tool being used to do work on a work target; and
a control unit configured to make the communications unit of the management system transmit, during a single communication session with the communications unit of the electric tool, setting information about multiple tasks of the work, wherein:
the setting information includes multiple pieces of work-by-work information respectively corresponding to the multiple tasks of the work,
each of the multiple pieces of work-by-work information includes information about specific details of a corresponding task of the multiple tasks of the work, and
the electric tool is configured to perform the multiple tasks of the work based on the setting information.

12. A management method for managing work to be done on a work target by an electric tool, the electric tool including a communications unit configured to establish wireless communication, the management method including:
establishing the wireless communication with the communications unit, wherein:
the wireless communication includes transmitting, during a single communication session with the communications unit, setting information about multiple tasks of the work to the communications unit,
the setting information includes multiple pieces of work-by-work information respectively corresponding to the multiple tasks of the work,
each of the multiple pieces of work-by-work information includes information about specific details of a corresponding task of the multiple tasks of the work, and
the electric tool is configured to perform the multiple tasks of the work based on the setting information.

13. A non-transitory storage medium storing thereon a program, the program being designed to cause a computer system to perform the management method of claim 8.

* * * * *